(12) United States Patent
Katz et al.

(10) Patent No.: US 6,392,595 B1
(45) Date of Patent: May 21, 2002

(54) METHOD AND APPARATUS FOR DIRECTIONAL RADIO COMMUNICATION

(75) Inventors: Marcos Katz; Juha Ylitalo, both of Oulu (FI)

(73) Assignee: Nokia Network Oy, Espoo (FI)

( * ) Notice: Subject to any disclaimer, the term of this patent is extended or adjusted under 35 U.S.C. 154(b) by 0 days.

(21) Appl. No.: 09/838,874

(22) Filed: Apr. 20, 2001

Related U.S. Application Data

(63) Continuation of application No. PCT/EP98/07038, filed on Nov. 4, 1998.

(51) Int. Cl.[7] ............... H04B 7/00; H04B 7/14
(52) U.S. Cl. ............... 342/367; 455/25; 455/517; 455/562
(58) Field of Search ............... 342/367, 422; 455/562, 517, 69, 25

(56) References Cited

U.S. PATENT DOCUMENTS 5,276,907 A * 1/1994 Meidan ............... 455/436
6,141,566 A * 10/2000 Gerdisch et al. ............... 455/562

FOREIGN PATENT DOCUMENTS

| WO | WO 98/36597 | 8/1998 |
|---|---|---|
| WO | WO 98/36598 | 8/1998 |

OTHER PUBLICATIONS

Swales, S.C. et al, "A Spectrum Efficient Cellular Base Station Antenna Architecture". Antennas and Propagation Society Int'l Symposium, Jul. 1992, pp. 1069–1072, vol. 2.*

* cited by examiner

*Primary Examiner*—Gregory C. Issing
(74) *Attorney, Agent, or Firm*—Altera Law Group, LLC

(57) ABSTRACT

A method of directional radio communication between a first station and a second station comprises the steps of determining from at least one signal received at the first station from the second station which of a plurality of different radio environment types is present between said first and second stations. A signal is transmitted from the first station to the second station with at least one parameter of said transmitted signal being dependent on the determined radio environment type.

23 Claims, 4 Drawing Sheets

METHOD AND APPARATUS FOR DIRECTIONAL RADIO COMMUNICATION

This application is a continuation of international application serial number PCT/EP98/07038, filed Nov. 4, 1998.

The present invention relates to a method and apparatus for directional radio communication in which signals between a first station and a second station may be transmitted only in certain directions. In particular, but not exclusively, the present invention is applicable to cellular communication networks using an antenna array in an adaptive manner, for example space division multiple access (SDMA).

With currently implemented cellular communication networks, a base transceiver station (BTS) is provided which transmits signals intended for a given mobile station (MS), which may be a mobile telephone, throughout a cell or cell sector served by a base transceiver station. However, space division multiple access (SDMA) systems have now been proposed. In a space division multiple access system, the base transceiver station will not transmit signals intended for a given mobile station throughout the cell or cell sector but will only transmit the signal in the beam direction in which a signal from the mobile station is received so that the same frequency can be used in the same cell at the same time to support two different users. SDMA systems may also permit the base transceiver station to determine the direction from which signals from the mobile station are received.

One problem is that the direction in which a signal is to be transmitted by the base station to the mobile station is determined on the basis of the signals received by the base station from the mobile station. However, in a frequency division duplex mode of operation, the frequencies of signals transmitted from the base station to the base station are quite different from frequencies used for the signals transmitted by the base station to the mobile station. The difference in the frequencies used in the up and down link signals means that the behaviour of the channel in the up link direction may be different from the behaviour of the channel in the down link channel.

In a time division duplex mode, the frequency used in the up and down link channels may be the same. It should be noted that in the time division duplex mode, signals will not be transmitted at the same time in that the up and down link channels. It can be assumed that the characteristics of the up and down link channels are the same provided that the duplexing time is much shorter than the coherence time of the channel. The coherence time of the channel is the interval over which a transmitted symbol will be relatively undisturbed by channel fluctuations. Channel fluctuations may be caused by changes in the radio environment, for example caused by movement of the mobile station. Accordingly, for the assumption that the up and down link channels are the same to be valid, a signal should be sent on the down link channel within a time period from receipt of the up link signal which is less than the coherence time for the channel. If a mobile station is moving, it is less likely than if the mobile station is stationary that the signal to be transmitted in the down link direction will be transmitted within a time period which is legs than the coherence time. Even if the mobile station is not moving the time between the receipt and transmission of a signal may be greater than the coherence time.

The spatial characteristics of an up link or a down link channel, such as its impulse response, will vary greatly in dependence on the radio environment.

In one known system which attempts to deal with this problem is shown in FIG. 1, the radio environment is divided into macro cells A, micro cells B and/or pico cells C. Macro cells A are relatively large whilst micro and pico cells B and C are much smaller. Pico cells C are smaller than micro cells B. Micro and/or pico cells B and C can be contained in macro cells A, as shown in FIG. 1. It is assumed that the radio signal will behave quite differently in macro cells A as compared to micro or pico cells B and C. Thus, this allows different types of strategy to be used in determining the parameters of the signal to be transmitted in the down link direction. However, with this system, the behaviour of the signals in the macro and micro or pico cells can be misleading. For example, the signal of a mobile station which is operating close to a base station in a macro cell A can be received by the base station with a wide angular spread. This type of behaviour is typical of micro or pica cells. Street channelling, which is caused by the presence of buildings, results in a signal being received with a narrow angular spread. If this type of behaviour occurs in a micro or pico cell, the base station will receive the signal with a narrow angular spread. This behaviour is more typical of macro cells. This model therefore does not always reflect the actual radio environment in a macro, micro or pica cell. Rather, the model relies on the expected radio environment given the position of the mobile station relative to the base transceiver station. Accordingly, this model will sometimes result in poor quality of signals.

It is an aim of certain embodiments of the present invention to provide a method and apparatus which avoids or at least mitigates this problem.

According to one aspect of the present invention, there is provided a method of directional radio communication between a first station and a second station, comprising the steps of determining from at least one signal received at the first station from the second station which of a plurality of different radio environment types is present between said first and second stations; and transmitting a signal from the first station to the second station, at least one parameter of said transmitted signal being dependent on the determined radio environment type.

As the radio environment type is determined in accordance with the at least one signal which is received, it reflects the actual radio environment and not the expected radio environment. Thus, the signal transmitted by the first station can better take into account the actual radio environment than with the system described hereinbefore.

Preferably, the radio environment types are determined from the angular spread of the signal received by the first station from the second station. This is a useful parameter of the received signal to use when determining the radio environment type in a directional radio system.

Preferably, a first radio environment type is determined to as be present when the at least one signal received by the first station from the second station has a relatively small angular spread and a second radio environment type is determined to be present when at the least one signal received by the first station from the second station has a relatively large angular spread. In embodiments of the present invention, there may be more than two types of radio environment. However, it is preferred that there only be two as this provides good results but is not overly complex.

Preferably, if the first radio environment is determined to be present, then the signal transmitted by the first station is transmitted with a relatively small beam spread and if the second radio environment is determined to be present then the signal is transmitted with a relatively large beam spread. Thus, the signal which is transmitted takes into account the characteristics of the determined radio environment type.

Preferably, the method further comprises the step of, if it is determined that the first radio environment type is present, determining if the beam spread of the signal to be transmitted by the first station is to be increased. Thus the method ensures that a narrow beam is used whenever it is appropriate. However, if there is any other indication that a wider beam spread should be used to avoid loss of communication or poor quality communication, then the beam spread can be increased.

The determining if the beam spread is to be increased step may comprise considering a parameter indicative of the distance between the first and second stations and increasing the beam spread of the signal to be transmitted to the second station of the distance between the first and second stations is relatively small. The parameter indicative of the distance between the first and second stations may be timing advance information in for example a GSM system. The beam spread of the signal to be transmitted may be increased, when the first radio environment type is present, if the distance between the first and second stations is less than a predetermined threshold.

Alternatively or additionally, the determining if the beam spread is to be increased step comprises considering a parameter indicative of the speed of movement of the second station relative to the first station and increasing the beam spread of the signal to be transmitted to the second station if the relative speed is relatively high. Again, a threshold value can be used so that if the relative speed is greater than a predetermined threshold, then the beam spread of the signal to be transmitted is increased.

In an alternative embodiment, the determining if the beam spread is to be increased step comprises considering a parameter indicative of the relative mobility of the second station relative to the first station and increasing the beam spread of the signal to be transmitted to the second station if the relative mobility is relatively large. Relative mobility takes into account the velocity of the second station relative the first station and the distance between the first and second stations. A threshold value may be used so that the beam spread of the signal to be transmitted is increased if the relative mobility is greater than a predetermined threshold.

Preferably said determining if the beam spread is to be increased step comprises considering the height of an antenna array of the first station above the surroundings and if the antenna array is relatively low with respect to the surroundings the beam spread is increased. A threshold value may of course also be used.

The determining if the beam spread is to be increased step may alternatively or additionally comprise determining the average angular spread for N-previous signals received from the second station by the first station. In, for example, a GSM system, the N-previous signals may be N-data bursts or slots in the case of CDMA systems. Preferably, the signal is transmitted by the first station with a beam spread similar to or the same as the average angular spread which has been determined. There may be a minimum beam spread which is used in the large angular spread environment. The period over which the average is determined preferably takes into account one or more of the following parameters: the distance between the first and second stations, velocity of the second station with respect to the first station, and relative mobility of the second station relative to the first station. If the second station is moving, then the period of time over which the average is taken is preferably decreased.

Preferably, the beam spread of the signal to be transmitted is not reduced if the first radio environment is present, only increased if appropriate.

Preferably, the method further comprises the step of, if it is determined that the second radio environment type is present, determining if the beam spread of the signal to be transmitted by the first station is to be decreased. Typically, if it is determined that the second radio environment type is present, the signal transmitted by the first station will typically have a wide beam spread. With this method, it is determined whether or not that beam spread can be reduced, which allows capacity to be improved.

The step of determining if the beam spread of the signal is to be decreased may comprise determining two extreme directions of arrival for signals from the second station at the first station for the last N-previous signals (for example the last N data bursts) received by the first station from the second station, and transmitting a signal to the second station with an beam spread defined by the two extreme directions of arrival. The directions of arrival may be the dominant directions of arrival.

Alternatively, the step of determining if the beam spread of the signal is to be decreased may comprise determining the variance of the angular spread of the previous N-signals received by the first station from a second station and transmitting to the second station with a beam spread which is related to the calculated variance. The variants of the dominant directions of arrival of N-preceding signals may be determined.

In both of the methods of determining if the beam spread of the signal is to be decreased, the N-previous signals may be N-previous bursts, if the method is being used in a GSM system or slots if the method is used in CDMA systems.

Preferably, if the large angular spread environment is determined to be present, the beam spread is only decreased, if appropriate, and not increased.

Preferably, the beam spread of the received and transmitted signals are defined by one or more beam directions. The width of the or each beam is preferably variable.

It is preferred that the first station is a bane transceiver station in a cellular telecommunication network. The second station may be a mobile station.

According to a second aspect of the present invention, there is provided a first station for directional radio communication with a second station, comprising: means for receiving signals from the second station; means for determining from at least one signal received by the first station from the second station which of a plurality of different radio environment types is, in use, present between said first and second stations; and transmitting means for transmitting a signal to the second station, at least one parameter of the transmitted signal being dependent on the determined radio environment type.

The radio environment types may be determined from the angular spread of the signal received by the receiving means. Preferably, when a signal from the second station is received by said receiving means with a relatively small angular spread, it is determined by said determining means that the radio environment is of a first type and if the signal from the second a station as received by the receiving means with a relatively large angular spread, it is determined that the radio environment is of a second type.

Preferably, the determining means is arranged to determine if the angular spread of the signal transmitted by the transmitting means can be increased if it is determined that the radio environment of the first type and decreased if the radio environment is of the second type.

For a better understanding of the present invention and as to how the same may be carried into effect, reference will now be made by way of example to the accompanying drawings in which.

Figure 2:
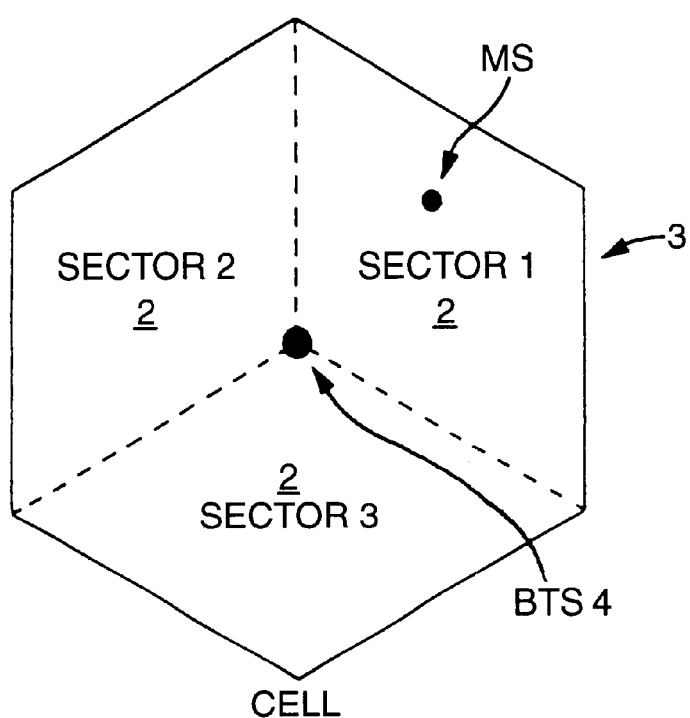
FIG. 2 shows a schematic view of a base transceiver station (BTS) and its associated cell sectors.

Reference will first be made to FIG. 2 in which the three cells sectors 2 defining a cell 3 of a cellular mobile telephone network are shown. The three cell sectors 2 are served by respective base transceiver stations (BTS) 4. Three separate bases transceiver stations 4 are provided at the same location. Each base station 4 has a separate transceiver which transmits and receives signals to and from a respective one of the three cell sectors 2. Thus, one dedicated base transceiver station is provided for each cell sector 2. The BTS 4 is thus able to communicate with mobile stations (MS) such as mobile telephones which are located in the respective cell sector 2.

The present embodiment is described in the context of a GSM (Global System for Mobile Communications) network. However, it to should be noted that embodiments of the present invention can also be used with other systems such as other frequency division multiple access systems, other time division multiple access systems, spread spectrum systems such as code division multiple access systems or hybrid systems which use more than one of the systems outlined above. In the (3SM system, a frequency/time division multiple access (F/TDMA) system is used. Data is transmitted between the base station 4 and the mobile station in bursts. The data bursts include a training sequence which is a known sequence of data. The purpose of the training sequence will be described hereinafter. Each data burst is transmitted in a given frequency band in a predetermined time slot in that frequency band. The use of a directional antenna array allows space division multiple access also to be achieved. Thus, in embodiments of the present invention, each data burst will be transmitted on a given frequency band, in a given time slot, and in a given direction. An associated channel can be defined for a given data burst transmitted on the given frequency, in the given time slot, and the given direction.

Figure 1:
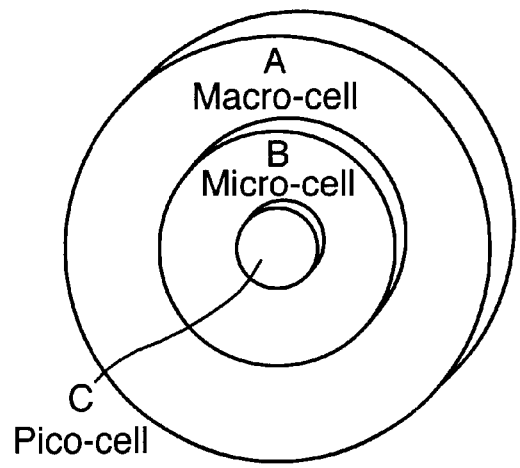
FIG. 1 shows a known model of a cell of a cellular network.
Figure 3:
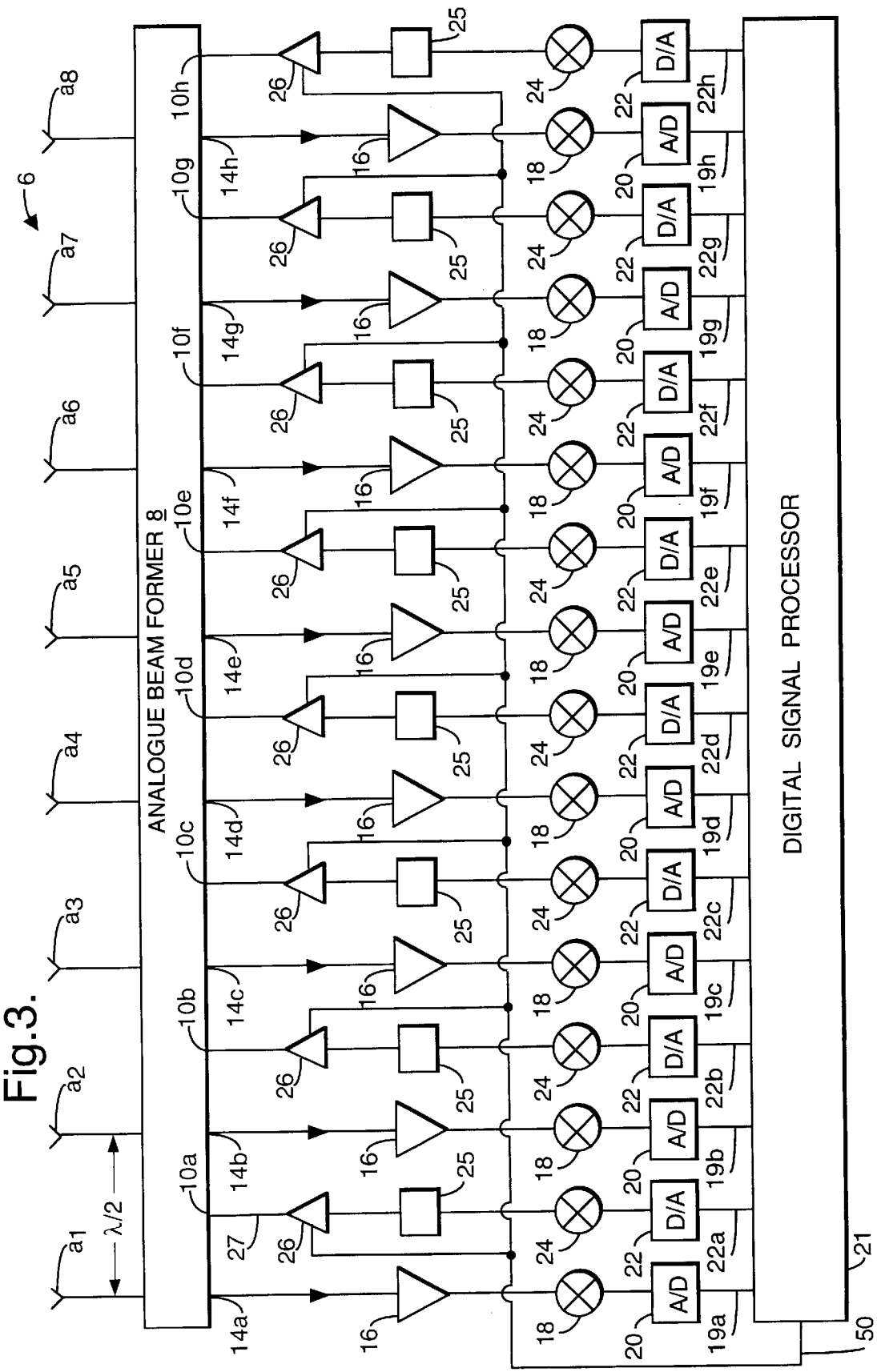
FIG. 3 shows a simplified representation of an antenna array and a base transceiver station embodying the present invention.

FIG. 3 shows a schematic view of one antenna array controlled by an analogue beam former of one base transceiver station 4 which acts as a transceiver. It should be appreciated that the array 6 shown in FIG. 3 only serves one of the three cell sectors 2 shown in FIG. 1. Another two antenna arrays 6 are provided to serve the other two cell sectors 2. The antenna array 6 has eight antenna elements a1 . . . a8. The elements a1 . . . a8 are arranged typically to have a spacing of a half wavelength between each antenna element and are arranged in a horizontal row in a straight line. Each antenna element is arranged to transmit and receive signals and can have any suitable construction. Each antenna element a1 . . . a8 may be a dipole antenna, a patch antenna or any other suitable antenna.

As will be discussed in more detail hereinafter, the antenna elements are controlled by a analogue beam former 8 which controls the number of beams generated as well as the width of respective beams. The analogue beam former 8 may be a Butler matrix.

Each antenna element a1 . . . a8 of the antenna array 6 is supplied with the same signal to be transmitted to a mobile station MS. However, the phases of the signals supplied to the respective antenna elements a1 . . . a8 are shifted with respect to each other. The differences in the phase relationship between the signals supplied to the respective antenna elements gives rise to a directional radiation pattern. Thus, a signal from the base station 4 can only be transmitted in certain directions in the cell sector 2 associated with the array 6. The directional radiation pattern achieved by the array 6 is a consequence of constructive and destructive interference which arises between the signals which are phase shifted with respect to each other and transmitted by each antenna element a1 . . . a8. The antenna array 6 can be controlled to provide a beam in any one or more of a plurality directions. In the embodiment shown, a maximum of eight beams can be provided. The width of each beam can also be controlled.

The relative phase of the signal provided at each antenna element a1 . . . a8 is controlled by the beam former 8 so that a signal can be transmitted in the desired beam direction or directions. The beam former A thus provides a phase shifting function. The beam former 8 has eight inputs 10a–h from the BTS 4 and eight outputs, one to each antenna element a1 . . . a8. The signals received by the respective inputs 10a–h comprise the data bursts to be transmitted and information as to the beam width. Each of the eight inputs 10a–h represents one of eight different beam directions in which a given data burst could be transmitted. For example, when the beam former 9 receives a signal on the first input 10a, the beam former 8 applies the signal provided on input 10a to each of the antenna elements a1 . . . a8 with the required phase differences to cause a beam to be produced in a given direction with the desired beam width so that the data burst is transmitted in that beam direction. Likewise, a signal provided on input 10b causes a beam in a different beam direction to be produced with the required beam width and so on.

As already discussed, the antenna elements a1 . . . a8 of the antenna array 6 receive signals from a MS as well as transmit signals to a MS. A signal transmitted by a MS will generally be received by each of the eight antenna elements a1 . . . a8. However, there will be a phase difference between each of the signals received by the respective antenna elements a1 . . . a8. With the assistance of the beam former 8 it is possible to determine from the relative phases of the signals received by, the respective antenna elements a1 . . . a8 the direction from which the signal has been received as well as the angular spread.

One or more beams of width W can be selected for transmission. Selecting one or more signals (10a–10h) is equivalent to generating a wider beam.

The beam former 8 thus has eight inputs, one from each of the antenna elements a1 . . . a8 for the signal received by each antenna element. The beam former 8 also has eight outputs 14a–h. Each of the outputs 14a to 14h corresponds to a particular direction from which a given data burst could be received. For example, if the antenna array 6 receives a signal from a MS from a first direction, then the beam former 8 will output the received signal on output 14a. A received signal from a second different beam direction will cause the received signal to be output from the beam former 8 on output 14b, and so on. In summary, the beam former 8 will receive on the antenna elements a1 . . . a8 eight versions of the same signal which are phase shifted with respect to one another. From the relative phase shifts, it is possible with the assistance of the beam former 8 to determine the direction from which the received signal has been received and a signal is output on a given output 14a–h in dependence on the direction from which the signal has been received. It is alternatively possible that the phase shifting functions and determination of angular spread could be done digitally in the digital signal processor.

In practice, a signal is unlikely to be received from just a single beam direction due to side lobes and/or multipath effects. In particular, in some environments, a single signal or data burst from a MS may appear to come from more than one direction due to reflection of the signal whilst it travels between the MS and the BTS 4. The beam former 8 will provide a signal on each output 14*a–h* corresponding to each of the directions from which a given signal or data burst appears to come. Thus, the same data burst may be provided on more than one output 14*a–h* of the beam former 8. However, the signals on the respective outputs 14*a–h* may be time delayed with respect to each other. It should be appreciated that the level or amplitude of the signal received in a number of directions will often be quite low and as such can, in some embodiments of the present invention be disregarded.

Each output 14*a–h* of the beam former 8 is connected to the input of a respective amplifier 16 which amplifies the received signal. One amplifier 16 is provided for each output 14*a–h* of the beam former 8. The amplified received signal is then processed by a respective processor 18 which manipulates the amplified signal to reduce the frequency of the received signal to the baseband frequency so that the signal can be processed by the BTS 4. To achieve this, the processor 18 removes the carrier frequency component from the input signal. Again, one processor 18 is provided for each output 14*a–h* of the beam former 8. The received signal, which is in analogue form, is then converted into a digital signal by an analogue to digital (A/D) converter 20. Eight A/D converters 20 are provided, one for each output 14*a–h* of the beam former 8. The digital signal is then input to a digital signal processor 21 via a respective input 19*a–h* for further processing.

The digital signal processor 21 also has eight outputs 22*a–h*, each of which outputs a digital signal which represents the signal which is to be transmitted to a given MS. The output 22*a–h* selected represents the beam direction in which the signal is to be transmitted. That digital signal information, is converted to an analogue signal by a digital to analogue (D/A) converter 23. One digital to analogue converter 23 is provided for each output 22*a–h* of the digital signal processor 21. The analogue signal is then processed by processor 24 which is a modulator which modulates onto the carrier frequency the analogue signal to be transmitted. Prior to the processing of the analogue signal by the processor 24, the signal is at the baseband frequency. The resulting signal is then output to a respective phase modulator 25.

One phase modulator 25 is provided for each processor 24 and the output of the respective phase modulators 25 are passed to respective power amplifiers 26 which amplify the respective signals. Again one power amplifier is provided for each phase modulator 25. The output of the respective power amplifiers 26 are provided to respective inputs 10*a–h* of the beam former 8. Thus, a processor 24, an amplifier 26 and a phase modulator 25 are provided for each output 22*a–h* of the digital signal processor 21.

Figure 4:
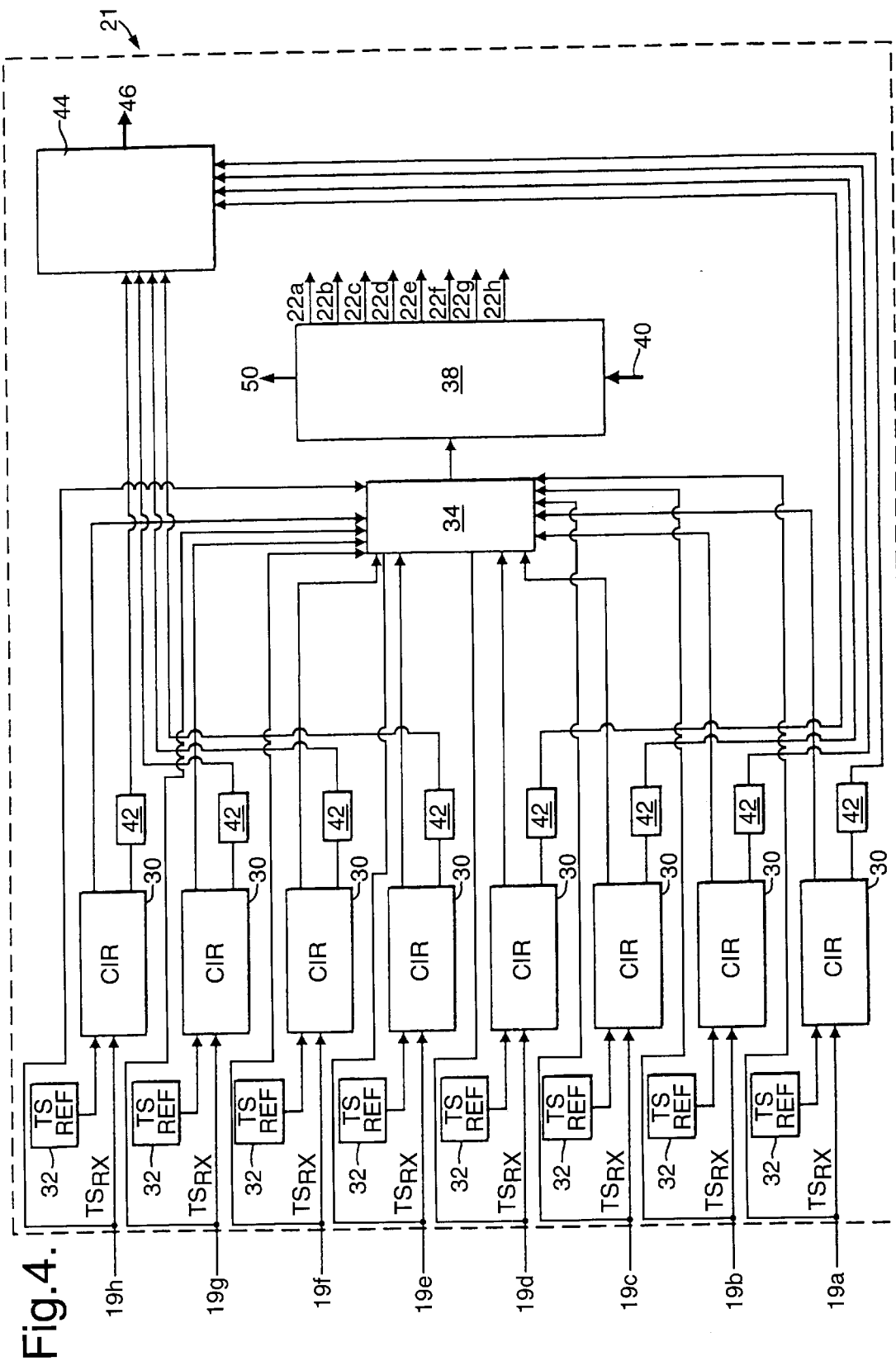
FIG. 4 shows a schematic view of the digital signal processor of FIG. 3.

Reference will now be made to FIG. 4 which schematically illustrates in more detail the digital signal processor 21. It should be appreciated that the various blocks illustrated in FIG. 4 do not necessarily correspond to separate elements of an actual digital signal processor 21 embodying the present invention. In particular, the various blocks illustrated in FIG. 4 correspond to various functions carried out by the digital signal processor 21. In one embodiment of the present invention, the digital signal processor 21 is at least partially implemented in integrated circuitry and several functions may be carried out by the same element.

Each signal which is received by the digital signal processor on the respective inputs 19*a–h* is separated by separating elements (not shown) into the information relating to beam width and the received signal part. The information relating to beam width is input to an analysis block 34 which will be described in more detail hereinafter. Each signal received by the digital signal processor 21 on the respective inputs 19*a–h* is input to a respective channel impulse response (CIR) estimator block 30. The CIR estimator block 30 includes memory capacity in which the estimated channel impulse response is stored. The CIR estimator block 30 also includes memory capacity for temporarily storing a portion of the received signal. The channel impulse response estimator block 30 is arranged to estimate the channel impulse response of the channel of the respective input 19*a–h*. As already discussed an associated channel can be defined for the given data burst transmitted in the selected frequency band, the allocated time slot and the direction from which the signal is received. The direction from which a signal is received and its width is ascertained with the help of the beam former 8 so that a signal received at input 19*a* of the digital signal processor represents mainly the signal that has been received from the first direction with the determined width and so on. It should be appreciated that the signal received at a given input may also include the side lobes of the signal received on, for example, adjacent inputs.

Each data burst which is transmitted from a mobile station Mg to the BTS 4 includes a training sequence TS. However, the training sequence $TS_{RX}$ which is received by the BTS 4 is affected due to noise and also due to multipath effects which leads to interference between adjacent bits of the training sequence. $TS_{RX}$ is also affected by interference from other mobile stations, for example mobile stations located in other cells or cell sectors using the same frequency which may cause co-channel interference. As will be appreciated, a given signal from the MS may follow more than one path to reach the BTS and more than one version of the given signal may be detected by the antenna array 6 from a given beam direction. The training sequence $TS_{RX}$ which is received from input 19*a* is cross correlated by the CIR estimator block 30 with a reference training sequence $TS_{REF}$ stored in a data store 32. The reference training sequence $TS_{REF}$ is the same as the training sequence which is initially transmitted by the mobile station. In practice the received training sequence $TS_{RX}$ is a signal modulated onto a carrier frequency while the reference training sequence $TS_{REF}$ is stored as a bit sequence in the data store 32. Accordingly, before the cross-correlation is carried out, the stored reference training sequence is similarly modulated. In other words the distorted training sequence received by the BTS 4 is correlated with the undistorted version of the training sequence. In an alternative embodiment of the invention, the received training sequence is demodulated prior to its correlation with the reference training sequence. In this case, the reference training sequence would again have the same form as the received training sequence. In other words, the reference training sequence is not modulated.

The reference training sequence $TS_{REF}$ and the received training sequence $TS_{RX}$ each are of length L corresponding to L bits of data and may for example be 26 bits. The exact location of the received training sequence $TS_{RX}$ within the allotted time slot may be uncertain. This is because the distance of the mobile station MS from the BTS 4 will influence the position of the data burst sent by the MS within the allotted time slot. For example, if a mobile station MS is relatively far from the BTS 4, the training sequence may occur later in the allotted time slot as compared to the situation where the mobile station MS is close to the BTS 4.

To take into account the uncertainty of the position of the received training sequence $TS_{RX}$ within the allotted time slot, the received training sequence $TS_{RX}$ is correlated with the reference training sequence $TS_{REF}$ n times. Typically, n may be for example 7 or 9. It is preferred that n be an odd number. The n correlations will typically be on either side of the maximum obtained correlation. The relative position of the received training sequence $TS_{RX}$ with respect to the reference training sequence $TS_{REF}$ is shifted by one position between each successive correlation. Each position is equivalent to one bit in the training sequence and represents one delay segment. Each single correlation of the received training sequence $TS_{RX}$ with the reference training sequence $TS_{REF}$ gives rise to a tap which is representative of the channel impulse response for that correlation. The n separate correlations gives rise to a tap sequence having n values. It should be appreciated that some of the taps may be zero or very small. This might occur at one or other or both ends of the tap sequence, the maximum value being in the middle region of the tap sequence.

Figure 5:
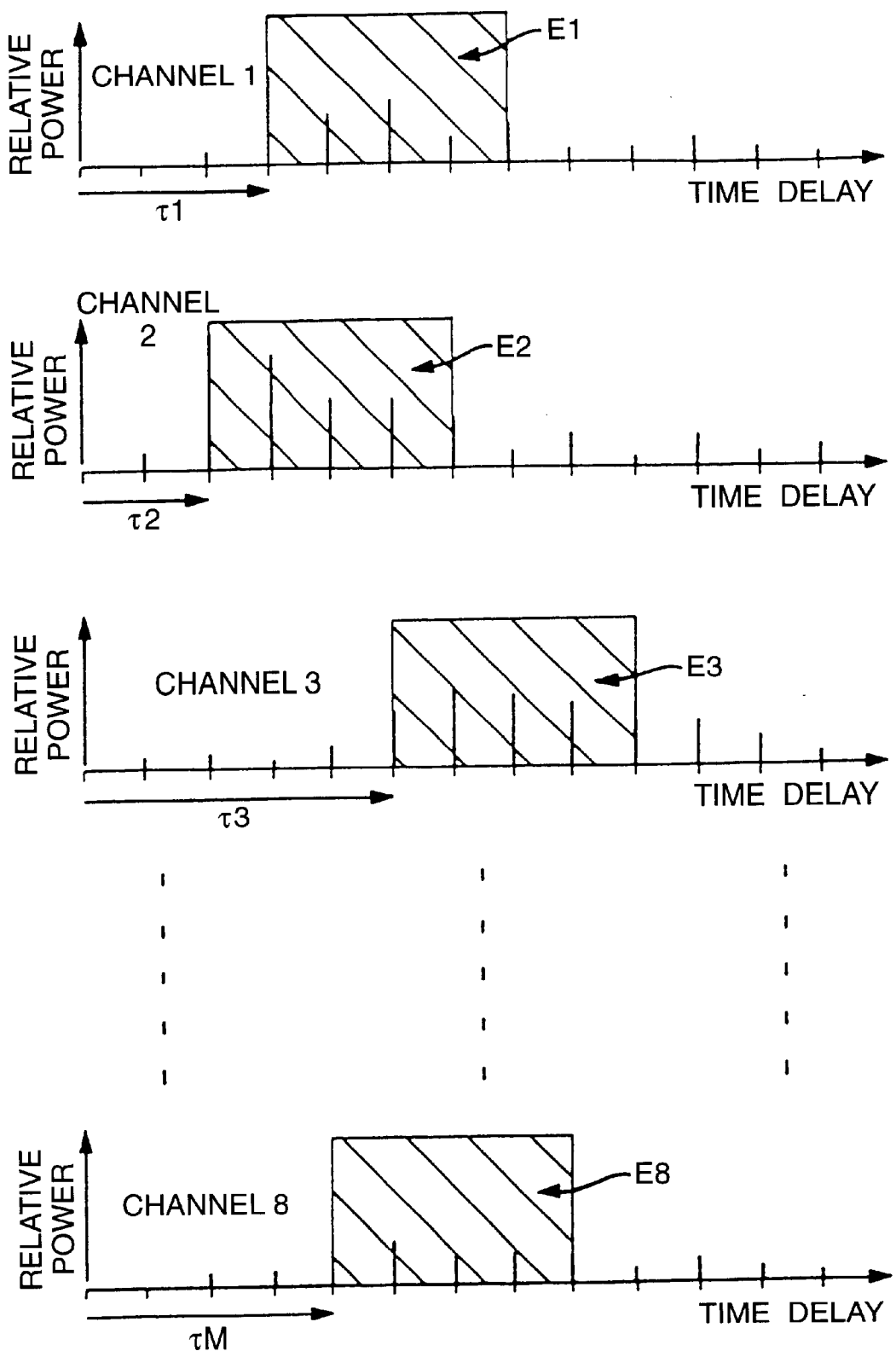
FIG. 5 illustrates the channel impulse response for four channels, out of eight possible channels.

Reference is now made to FIG. 5 which shows the channel impulse response for four of eight possible channels corresponding to the eight spatial directions. In other words, FIG. 5 shows the channel impulse response for four channels corresponding to a given data burst received in four of the eight possible beam directions detectable by the beam former 8 from the mobile station, the data burst being in a given frequency band and in a given time slot. The x axis of each of the graphs is a measure of time delay whilst the y axis is a measure of relative power. Each of the lines (or taps) marked on the graph represents the multipath signal received corresponding to a given correlation delay. Each graph will have n lines or taps, with one tap corresponding to each correlation.

From the estimated channel impulse response, it is possible to determine the location of the training sequence within the allotted time slot. The largest tap values will be obtained when the best correlation between the received training sequence $TS_{RX}$ and the reference training sequence $TS_{REF}$ is achieved.

The CIR estimator block 30 also determines for each channel the five (or any other suitable number) consecutive taps which give the maximum energy. The maximum energy for a given channel is calculated as follows:

$$E = \sum_{j=1}^{5} (h_j)^2 \qquad (I)$$

where h represents the tap amplitude resulting from a cross correlation of the reference training sequence $TS_{REF}$ with the received training sequence $TS_{RX}$. The CIR estimator block 30 estimates the maximum energy for a given channel by using a sliding window technique. In other words, the CIR estimator block 30 considers each of five adjacent values and calculates the energy from those five values. The five adjacent values giving the maximum energy are selected as representative of the impulse response of that channel.

The energy can be regarded as being a measure of the strength of the desired signal from a given MS received by the BTS 4 from a given direction. Thin process is carried out for each of the eight channels which represent the eight different beam directions from which the same data burst could be received. The signal which is received with the maximum energy has followed a path which provides the minimum attenuation of that signal. This path is the dominant direction of arrival path.

The analysis block 34 is connected to the outputs of the CIR estimator blocks 30. The analysis block 34 makes an assessment as to the total angular spread of the received signal (which may be from more than one beam direction). This assessment can be made in any appropriate way. In one method of determining the angular spread, the analysis block 34 considers which of the channels has a maximum energy which exceeds a given threshold value. The total angular spread is determined by summing the associated beam width information of those channels which have a maximum energy which exceeds the threshold. The calculated angular spread is then compared to a further threshold value. If the total angular spread is below the given threshold then it is determined by the analysis block 34 that the mobile and base stations are operating in a small angular spread radio environment. If the total angular spread is above the given threshold, then it is determined by the analysis block 34 that the mobile and base stations are operating in a large angular spread radio environment. The base transceiver station is thus able to determine whether it and the mobile station are operating in a small angular spread radio environment or a large angular spread radio environment.

It should be appreciated that in the following the angular spread of a signal refers to the sum of the width of each beam direction from which a signal is deemed to be received. Beam spread refers to the sum of the width of each beam direction in which a signal is transmitted.

In a small angular spread environment, a signal from a mobile station is received by a base transceiver station with a small angular spread. In other words the received signal is narrow or well defined. It should be appreciated that in general the angular spread is inversely proportional to the distance between the mobile station and the base transceiver station. Thus angular spread will generally increase the closer that a mobile station is to a base transceiver station. Typically, but not always, the small angular spread will be achieved when the mobile station is relatively far from the base station and/or the base station antenna is well above the surrounding environment. This is because the likelihood that signals from a mobile station can follow a direct path without reflecting is increased.

The total beam spread of the signal transmitted by the base station is controlled as follows. As the analysis block 34 has determined that the base station and mobile station are operating in a small angular spread environment, the principal strategy is to transmit as with as small an beam spread as possible to the mobile station. However there may be certain circumstances where it is desirable to broaden the beam spread of the signal. For example if fading occurs in a channel, a signal with a small angular spread may be received by the base station. In the absence of channel fading a signal with a wider angular spread may be received by the base station. If the base station were then to use that narrow beam spread when transmitting to the mobile station, the quality of the signal received by the mobile station may be reduced. For example problems caused by noise may be exacerbated. Another problem may arise if the mobile station is moving. If the mobile station has moved a significant amount since the mobile station transmitted its signal to the base station, a signal transmitted by the base station with a narrow beam spread may not be satisfactorily received by the mobile station. If a wider beam spread were used by the base station, this could avoid this problem.

To deal with the first problem, the angular spread of N preceding bursts received from the mobile station are calculated and the average angular spread is calculated. The average is taken over a time period which is larger than the time period over which short term fading occurs. The length of the averaging time period is also limited by the mobility of the mobile station. In particular the time period over which the average is carried out should not be so large that the mobile station has significantly moved relative to the base transceiver station. In one embodiment of the present invention, the period over which the average is taken is proportional to the timing advance information.

Timing advance information is used in GSM systems to ensure that a signal transmitted by the mobile station to the BTS 4 falls within its allotted time slot. If a mobile station is relatively far from the base station, a signal from the mobile station will take longer to reach the base station. To ensure that the signal received by the base station from the mobile station is in its allotted time slot, the timing advance information causes the mobile station to send its signal to the base station earlier as compared to when the mobile station is closer to the base station. The timing advance information can be calculated from a calculated relative delay and the current timing advance information.

The analysis block 34 may be arranged to determine the position of the beginning of each window, for each channel, which defines the five values providing the maximum energy. The time delay for each window is then determined based on the time between a reference point and the beginning of the window. That reference point may be the common time when all received training sequences in each branch start to be correlated, the timing corresponding to the earliest window edge of all the branches or an equivalent common point. The position of the received training sequence $TS_{RX}$ in the allotted time slot is a measure of relative time delay. An average relative time delay may be calculated or the relative delay of the strongest signal may be selected as the relative delay used to calculate the required timing advance information.

To deal with the second problem, the beam spread of the signal transmitted by the base transceiver station is set in accordance with the distance between the base transceiver station and the mobile station. The timing advance information may be used as a measure of the distance between the mobile station and the base transceiver station. As the distance between the base station and the mobile station increases, a narrower angular spread can be used and vice versa. Alternatively, the further that the mobile station is from the base station, the less that the base station tries to increase the angular spread of the transmitted signal.

The velocity of the mobile station can be used to control the transmitted beam spread. The velocity of the mobile station can be calculated in any suitable manner, for example using an envelope algorithm. This may be as an alternative to using the distance measurement or in addition thereto. In particular, the faster the mobile station is moving, the larger the downlink beam width which should be used. In both of the cases described hereinbefore, a threshold value can be used. When the velocity is below a given threshold or the distance between the mobile station and the base transceiver station is above a given value, then the base station is controlled to transmit with a beam spread which is the same or similar as the angular spread of the signal received by the base station or of a predetermined value for the small angular spread radio environment. When the velocity is above the threshold or the distance is below the threshold, then the beam spread may be increased in proportion to or determined in accordance with the velocity or the distance. It is possible that in embodiments of the present invention, that the threshold value may be dispensed and the beam spread be in proportion to the distance between the base station and the mobile station or the velocity of the mobile station. However, it is preferred that a threshold value be used.

It is also possible to determine if the beam spread is to be increased based on the relative mobility of the mobile station with respect to the base station. The relative mobility m of the mobile station is defined as follows:

$m=v/d$ where v is the velocity of the mobile station and d is the distance between the mobile station and the base transceiver station. The beam spread would then be in proportion to or determined in accordance with the mobility. The beam spread of the signal to be transmitted may be proportional to the angular spread of the received signal x the relative mobility. A threshold value may be used. Accordingly, when the mobility value exceeds the threshold value, the beam spread of the signal can be increased in dependence on the calculated mobility. Alternatively, the beam spread may be made proportional to the relative mobility, regardless of the angular spread of the signal received from the base transceiver station. However it is preferred that in the small angular spread environment that the beam spread of the transmitted signal have a predetermined minimum value.

In the small angular spread environment, the beam spread of the signal transmitted by the base transceiver station may be the same or of a similar size as the angular spread of the signal received by the base station or be a predetermined minimum size unless the averaged angular spread over the previous N bursts, the distance between the base station and the mobile station, the velocity of the mobile station or the relative mobility of the mobile station indicate that the beam spread of the signal transmitted by the base station should be increased. It is preferred that in a small angular spread environment the beam spread is never reduced in size below a minimum value. The minimum beam spread is used as long as the received angular spread is below a minimum size. It should be-noted that one or more of the above factors can be taken into account when determining if the beam spread of the signal to be transmitted by the base station.

In all of the above described methods, the analysis block 34 may consider if the environment is a small angular spread environment, the distance between the mobile station and base station, the velocity of the mobile station, height of the base station antenna array above the surroundings and/or the relative mobility of the mobile station and select an algorithm to determine the beam spread based on the values of the distance, velocity and/or relative mobility.

If the analysis block 34 determines that the beam spread is above the given threshold, then as discussed hereinbefore, it is determined that the mobile and base stations are operating in a large angular spread radio environment.

In the large angular spread environment, a signal from a mobile station will be received with a large angular spread. Typically, but again not always, the wide angular spread will occur when the mobile station is close to the base station and/or the antenna array of the base station is at low level with respect to the surroundings. The wide angular spread may cover the entire cell sector 2. The base transceiver station could transmit to the mobile station with the same or similar wide angular spread which it receives and therefore could transmit over the entire cell sector 2. Clearly this is undesirable in terms of capacity. Alternatively, if it is determined that the radio environment is a large angular spread radio environment, then a predetermined wide beam spread could be used by the base station to transmit a signal to the mobile station. The predetermined beam spread may in certain situations, be less than the angular spread of the received signal.

Accordingly it is proposed that the beam spread of the signal transmitted by the base station be controlled as follows. As the analysis block 34 knows that the base transceiver and mobile station with which it is communicating are operating in a large angular spread environment, the base transceiver station transmits with a wide beam spread (determined by the angular spread of the received signal or being the predetermined angular spread) unless it determines that the beam spread can be reduced.

One method of determining whether the beam spread of the signal to be transmitted can be reduced is as follows. The dominant direction of arrival for the last N bursts from the mobile station at the base transceiver station are considered. The dominant direction of arrival is the beam direction from which the strongest version of a signal has been received by the base station from the mobile station. The variance of the dominant direction of arrival of the last N bursts is calculated and the beam spread of the signal to be transmitted by the base transceiver station is reduced, if appropriate, in proportion to the calculated variance.

A second method of determining whether the beam spread can be reduced is as follows. The two extreme dominant directions of arrival for the N previous bursts received from the mobile station by the mobile station are determined. In other words, the dominant direction of arrival having the lowest and the highest angle of incidence at the base station are identified, for the preceding N burst. The signal transmitted by the base station will then have an beam spread defined by the difference between the angles of incidence of the two extreme dominant directions of arrival. The direction of transmission of the signal will be in the beam directions of the two extreme dominant directions of arrival of the signal at the base station and the intervening beam directions. Thus the signal transmitted by the base station will have a spread which extends between the extreme dominant directions of arrival of the signal at the base station.

It should be noted that in embodiments of the present invention, when it is determined that a large angular spread radio environment is present, the beam spread can only be reduced and not increased. The two methods for determining if the beam spread is to be reduced can be used together or may be alternatives.

Generating block 38 is responsible for generating the signals which are to be output from the digital signal processor 21. The generating block 38 has an input 40 representative of the speech and/or information to be transmitted to the mobile station MS. Generating block 38 is responsible for encoding the speech or information to be sent to the mobile station MS and includes a training sequence and a synchronising sequence within the signals. Generating block 38 is also responsible for production of the modulating signals. Based on the generated signal and determined beam directions provided by an output from the analysis block 34, the generating block 38 provides signals on the respective outputs 22*a*–*h* of the digital signal processor 21.

The generating block 38 also provides an output 50 which is used to control the amplification to ensure that signals transmitted in the one or more beam directions have the required power levels. The power levels can be determined by the analysis block 34 using any suitable method. It should be noted that the power levels of each of the amplifiers 26 can be individually set. The output of the channel impulse response blocks 30 are also used to equalise and match the signals received from the mobile station MS. In particular, the effects of intersymbol interference resulting from multipath propagation can be removed or alleviated from the received signal by the matched filter (MF) and equaliser block 42. It should be appreciated that the matched filter (MF) and equalizer block 42 hag an input (not shown) to receive the received signal from the MS. The output of each block 42 is received by recovery block 44 which is responsible for recovering the speech and/or the information sent by the MS. The steps carried out by the recovery block include demodulating and decoding the signal. The recovered speech or information is output on output 46.

In one modification to the embodiment described hereinbefore, the analogue beam former is replaced by an digital beam former. In general analogue beam formers are less flexible than digital beam formers. This is because analogue beam formers generally provide a fixed number of beams each having a fixed angular spread. In digital beam formers the number of beams and their beam width can be varied as required. The appropriate number of beams is then selected. The use of analogue beam formers provides coarse control of the transmitted beam width as well as the direction in which a beam is transmitted. It should be appreciated that with digital beamformers since the widths of the beams can be varied as required, a wide single beam could be transmitted which effectively covers two or more different beam directions. This removes the problems caused by adjacent beams overlapping and interfering. The digital beam former thus provides increased flexibility to the operation of the base transceiver station and is able to provide increased capacity as compared to, for example to the Butler matrix circuitry.

As will be appreciated the above embodiment has been described as providing eight outputs from the analogue beam former. It should be appreciated that in practice a number of different channels will be output on each output of the digital beam former at the same time. Those outputs may be at different frequency bands.

Whilst individual amplifiers, processors, phase modulator, analogue to digital converters and digital to analogue converters are shown, those in practice may be provided with a single element which has a plurality of inputs and outputs.

The embodiment described hereinbefore has been described in the context of a SDMA system. However, embodiments of the present invention can be used where an array of antennae is provided which can be controlled in an adaptive manner.

It should be appreciated that embodiments of the present invention can be used in any type of cellular communications network transferring speech or data. Embodiments of the present invention are also applicable to cellular communications networks which use transmit and receive packet data. Embodiments of the present invention are also applicable to packet radios.

Although the embodiment of the present invention described hereinbefore has been a base transceiver station, it should be appreciated that embodiments of the present invention can be incorporated in a mobile station the like.

Embodiments of the present invention may have applications other than in cellular telecommunication networks. For example embodiments of the present invention may be used in any environment which requires directional radio communication. For example, the above described embodiments could be used in private radio networks or the like.

What is claimed is:

1. A method of directional radio communication between a first station and a second station, at least one parameter of said transmitted signal being dependent on the determined radio environment type, comprising the steps of:

determining from at least one signal received at the first station from the second station which of a plurality of different radio environment types is present between said first and second stations based on the angular spread of the at least one signal received by the first station from the second station, wherein a first radio environment type is determined to be present when the at least one signal received by the first station from the second station has a relatively small angular spread and a second radio environment type is determined to be present when the at least one signal received by the first station from the second station has a relatively large angular spread;

selecting between transmitting a signal from the first station to the second station with a relatively small beam spread and with a relatively large beam spread, wherein a relatively small beam spread is selected when it is determined that the first radio environment type is present, and wherein if it is determined that the first radio environment type is present, the method further comprises the step of determining if the beam spread selected should be increased based on a parameter; and transmitting a signal from said first station to said second station in dependence on the determined radio environment type and said parameter.

2. A method as in claim 1, wherein if the second radio environment type is determined to be present then a relatively large beam spread is selected for the signal to be transmitted from the first station to the second station.

3. A method as claimed in claim 1, wherein the determining if the beam spread is to be increased step, comprises considering a parameter indicative of the distance between the first and second stations and increasing the beam spread of the signal to be transmitted to the second station if the distance between the first and second stations is relatively small.

4. A method as claimed in claim 3, wherein the beam spread of the signal to be transmitted is increased if the distance between the first and second stations is less than a predetermined threshold.

5. A method as claimed in claim 1, wherein the determining if the beam spread is to be increased step, comprises considering a parameter indicative of the speed of movement of the second station relative to the first station and increasing the beam spread of the signal to be transmitted to the second station if the relative speed is relatively high.

6. A method as claimed in claim 5, wherein the beam spread of the signal to be transmitted is increased if the speed of the second station relative to the first station is greater than a predetermined threshold.

7. A method as claimed in claim 1, wherein the determining if the beam spread is to be increased step, comprises considering a parameter indicative of the relative mobility of the second station relative to the first station and increasing the beam spread of the signal to be transmitted to the second station if the relative mobility is relatively large.

8. A method as claimed in claim 7, wherein the beam spread of the signal to be transmitted is increased if the relative mobility of the second station relative to the first station is greater than a predetermined threshold.

9. A method as claimed in claim 1, wherein said determining if the beam spread is to be increased step comprises considering the height of an antenna array of the first station above the surroundings and if the antenna array is relatively low with respect to the surroundings the beam spread is increased.

10. A method as claimed in claim 1, wherein the determining if the beam spread is to be increased step comprises determining the average angular spread for N previous signals received from the second station by the first station.

11. A method as claimed in claim 9, wherein the signal is transmitted by the first station with a beam spread similar to the same as the average angular spread.

12. A method as claimed in claim 10, wherein the period over which the average is determined takes into account one or more of the following parameters:

distance between the first and second stations; velocity of the second station with respect to the first station; and relative mobility of the second station relative to the first station.

13. A method as claimed in claim 2 further comprising the step of, if it is determined that the second radio environment type is present, determining if the beam spread of the signal to be transmitted by the first station is to be decreased.

14. A method as claimed in claim 2, wherein the step of determining if the beam spread of the signal is to be decreased comprises determining two extreme directions of arrival for signals from the second station at the first station for the last N previous signals received by the first station from the second station, and transmitting a signal to the second station with beam spread defined by the two extreme directions of arrival.

15. A method as claimed in claim 13, wherein the step of determining if the beam spread of the signal is to be decreased comprises determining the variance of the angular spread of the previous N signals received by the first station from the second station and transmitting the signal to the second station with a beam spread which is related to the calculated variance.

16. A method as claimed in claim 15, wherein the variance of dominant directions of arrival of N preceding signals is determined.

17. A method as claimed in claim 1 wherein the beam spread of the transmitted signal, is defined by one or more beam directions.

18. A method as claimed in claim 17, wherein the width of the or each beam is variable.

19. A method as claimed in claim 1, wherein the first station is a base transceiver station in a cellular telecommunications network.

20. A method as claimed in claim 19, wherein the second station is a mobile station.

21. A first station for directional radio communication with a second station including transmitting means for transmitting a signal to the second station, at least one parameter of the transmitted signal being dependent on the determined radio environment type, said station comprising:

means for receiving signals from the second station;

means for determining from at least one signal received by the first station from the second station which of a plurality of different radio environment types is, in use, present between said first and second stations based on the angular spread of the signal received by said received means, wherein when a signal from the second station is received by said receiving means with a relatively small angular spread, it is determined by said determining means that the radio environment is of a first type and if a signal from the second station is received by said receiving means with a relatively large annular spread, it is determined that the radio environment is of a second type;

means for selecting between transmitting a signal from said first station to said second station with a relatively small beam spread and with a relatively large beam spread, wherein said means for selecting is operable to select a relatively small beam spread when it is determined that the first radio environment type is present;

means for determining, when it is determined that the first radio environment type is present, if the beam spread selected should be increased based on a parameter of the received signal; and a transmitter arranged to transmit a signal from said first station to said second station with a beam spread determined by the determining means.

22. A first station as claimed in claim 21, wherein said determining means is arranged to determine if the angular spread of the signal transmitted by the transmitting means can be decreased if it is determined that the radio environment is of the second type.

23. A first station as claimed in claim 21, wherein the first station is a base transceiver station.

* * * * *